United States Patent

[11] 3,615,984

| [72] | Inventor | Raymond Burt Chase |
| | | Midland, Mich. |
| [21] | Appl. No. | 724,564 |
| [22] | Filed | Apr. 26, 1968 |
| [45] | Patented | Oct. 26, 1971 |
| [73] | Assignee | The Dow Chemical Company |
| | | Midland, Mich. |

[54] METHOD OF REPAIRING A DAMAGED VITREOUS COATED NOZZLE
1 Claim, 4 Drawing Figs.

[52] U.S. Cl. .................................................... 156/94,
                                                       285/55, 285/15
[51] Int. Cl. ................................................. F16l 9/14
[50] Field of Search ........................................ 156/94, 98;
             65/28; 29/401, 402, 403, 404, 405; 285/15, 53-55;
                                                              138/97

[56]                References Cited
              UNITED STATES PATENTS
2,310,927  2/1943  Bay ................................  285/55
2,445,273  7/1948  Kennedy .........................  285/55
2,716,428  8/1955  Pennella .........................  285/15
2,722,734  11/1955 Grant ..............................  156/94
3,129,727  4/1964  Tanaka ............................  285/55
3,317,222  5/1967  Maretzo ..........................  138/97
3,453,004  7/1969  Toelke et al. ..................  285/55
              FOREIGN PATENTS
763,251    12/1956 Great Britain ...............  156/94
1,087,061  10/1967 Great Britain ...............  156/94

Primary Examiner—Benjamin A. Borchelt
Assistant Examiner—Daniel A. Bent
Attorneys—Griswold & Burdick and Albin R. Lindstrom ABSTRACT: A method of repairing a damaged nozzle and a shield conforming to undamaged profile and made of corrosion resistant metal preferably tantalum, characterized by a returning exterior flange and a crimped interior flange and adapted to be formed of sheet tantalum: used to restore conformation and repair damage to a nozzle of a glass-lined chemical reaction vessel; in conjunction with filler and cementitious resins.

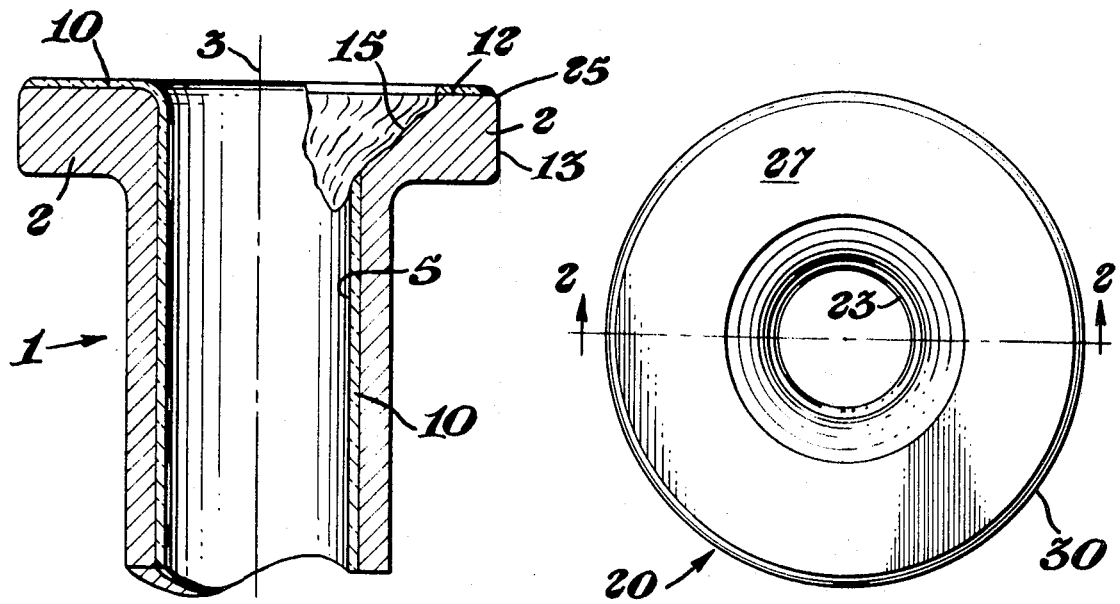
Fig. 1
Fig. 3
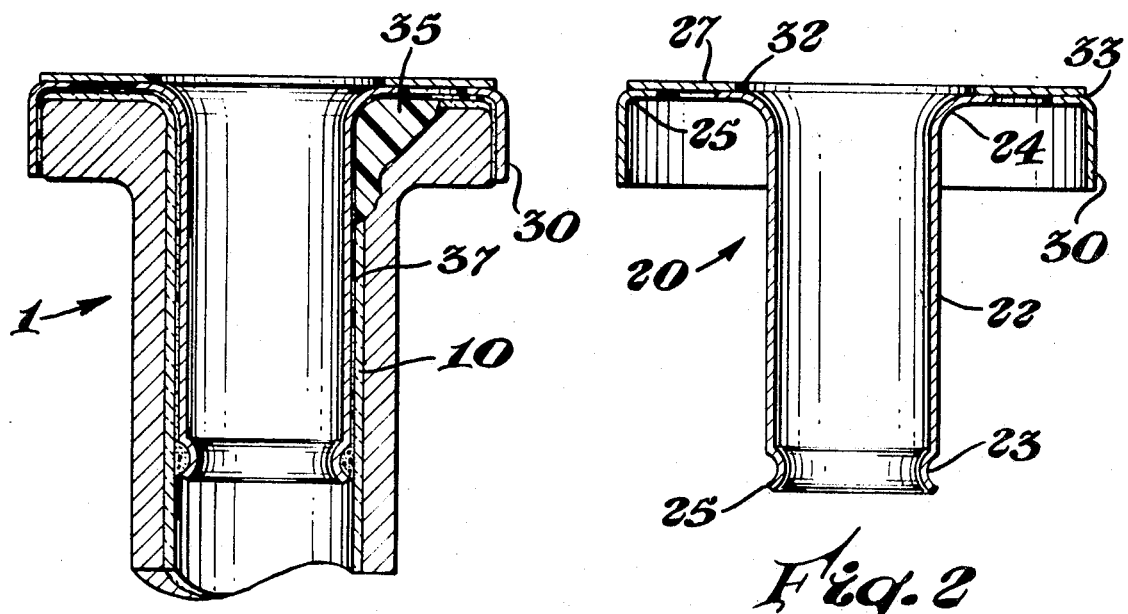
Fig. 4
Fig. 2

3,615,984

METHOD OF REPAIRING A DAMAGED VITREOUS COATED NOZZLE

BACKGROUND OF THE INVENTION

1. Field of the Invention

In the chemical industry many chemical reactions are practicable to carry out only in highly corrosion-resistant apparatus. Much of this apparatus is made of steel or iron for strength but is lined with glass which is fired and fused into position as a continuous, intact, corrosion-resistant coating.

Unlined reactor vessels are readily connected with cooperating inlet and outlet plumbing by means of drilled and tapped openings in the wall of the vessel or in a thickened or reenforced wall portion. Such connections are not adapted to be used in glass-lined reactor vessels; the pipes which bring in one or more reactants and carry away product or the like are, themselves, also usually glass-lined. It is impractical or impossible to connect such plumbing by means of threads without exposing raw metal to corrosion. Moreover, such stresses as are always set up at a threaded joint that is secured tightly tend to break the glass lining. Other means are used.

As means of providing inlet and outlet connections to reactor vessels, and as means of connecting glass-lined pipes to such vessels or to sections of one another and the like, such apparatus is provided with a special opening and terminating structure called a nozzle. The name "nozzle" is commonly employed in the chemical reactor vessel art although it gives rise to some ambiguity because the structure is not to be equated with and does not perform the same function as a "-nozzle" on the end of, for example, a fire hose or garden hose. The expression "nozzle" is used in the present specification and claims exclusively to designate a structure that is part of a vitreous lined hollow article by means of which such article is to be connected with another such article; as a reactor vessel to a glass-lined pipe, one glass-lined pipe to another, or the like.

A nozzle in the sense here indicated typically takes the form of a length of pipe or tubing, usually of quite heavy metal, which may be a terminal length of a glass-lined pipe or may be a piece of pipe or tubing attached, as by welding and the like, to an opening in a vessel wall; the pipe proceeds outward from such vessel wall for a convenient distance, typically a few inches to approximately a foot; it is there produced outward at right angles from the main axis of such pipe to form a flat facing flange. When glass lining is applied to such vessel, all points of junction between the metal nozzle structure and the vessel are brought to a smooth, uniform finish; and the powdered glass frit that is applied in aqueous slurry as a first step in providing a glass lining is applied to not only the vessel interior but also to the nozzle, namely, to the interior of the said short length of pipe and, outwardly of it to the face of the flange with which the pipe terminates outwardly. When the same is applied to an end of a glass-lined pipe, the pipe is produced to form a flange in a plane at right angles to the main axis of the pipe and the glass coating is applied to much and perhaps all of the face of that flange.

Intact equipment, such as new equipment, is connected for service by bringing the flange of a nozzle terminating a glass-lined pipe to face a flange of a nozzle opening into a reactor vessel. Between them is placed a special gasket which is an article of commerce and the flange faces of the opposing nozzles are then clamped forcibly together placing the gasket under strong pressure and providing a connection which, when properly installed, does not leak between supply or outlet pipes and a reactor vessel, but presenting no unprotected metal surface for corrosion.

All industrial equipment is subject to certain hazards; glass linings and coatings of reaction vessels and their supply pipes are subject to chipping and breakage; the metal underlying such glass lining is, in some chemical reactions, quickly removed by serious corrosion when the protective glass lining is broken.

Nozzle damage of reactor vessels has at times necessitated the disuse of the vessel. Nozzle damage repair takes place under demanding conditions that do not pertain to repairs of some other kinds; as connections to supply or delivery pipes are made, not only is the possibility always present of an awkward bringing together of the heavy objects with resulting chipping of the glass, but also, especially when replumbing is involved, there is the possibility of spill or leakage of small, retained amounts of corrosive fluid. For this reason, special care is needed in nozzle repair.

Because damage in need of repair is usually found only where glass coating covers or is intended to cover the metal surface, such is usually confined to the outward flange face, the curve by which such flange face intersects the interior wall of the pipe with which it is an integral part, or the interior pipe wall surface. By reason of the complicated curved shape, damage is most difficult to repair and in greatest need of good repair when it occurs at the curved intersection between the flange face and the pipe interior wall. Damage at this locus is not unusual.

2. The Prior Art

Hitherto, repairs of broken glass coating surfaces of nozzles have been made by the use of "nozzle shield" structures. These have been manufactured by spinning or by cutting, forming, and welding; routinely, they have covered essentially only the area originally covered by glass: namely, from the edge of the flange face, inwardly as a disc to be produced in a curve intersecting the tubular interior of the nozzle and proceeding in such tubular interior for a distance great enough to cover discontinuity in the glass lining. Such construction is represented in U.S. Pat. No. 2,725,159.

While such shields have been accepted as standard in many chemical plants, they have also often been found to be less than entirely satisfactory. Leakage has occurred under and around the edges of such shields. When, as is often the case, the leaking material is acidic or the like and it comes into contact with underlying metal, hydrogen is released and, building up pressure beneath the glass lining, contributes to spalling and chipping and worsening of the problem. Despite the existence of standard shields for nozzle repair, damage to glass lining of a vessel nozzle has been regarded as serious damage to a reactor vessel and repair has been regarded as dubious and temporary.

When damage through corrosion as well as glass chipping has resulted in significantly altering the surface contour of the nozzle, a phenomenon which is not rare, standard prior art practice has been to disuse the vessel, return it to the factory, remove the damaged nozzle and weld a new nozzle into place, and thereafter recoat the entire interior and all necessary surfaces of the entire vessel including the new nozzle with corrosion-resistant glass coating. This procedure has been extremely expensive. Moreover, production stoppage in the meantime is very costly.

Having reference to the accompanying drawings,

FIG. 1 illustrates, in section, a damaged nozzle;

FIG. 2 illustrates the shield of the present invention, in elevational section; taken along line 2 — 2 in FIG. 3;

FIG. 3 illustrates the repair shield of the present invention in plan, and

FIG. 4 illustrates the completed repair, with repair shield in place, and the damaged nozzle restored and ready to be returned to service.

Having reference, now, more particularly to the accompanying drawings, in FIG. 1, nozzle 1 represents a length of tubing produced, as at the end of a glass-lined pipe or tube, or from the wall of, and communicating with the interior of a reaction vessel; it is produced to flange 2, where the side walls are produced in an approximate plane normal to the long axis 3 of the nozzle. Glass lining 10 proceeds over all corrosion-exposed surfaces, and is carried laterally over the exposed, outer face 12 of flange 2 to or nearly to its edge. In FIG. 1, damage of a relatively commonplace kind is illustrated at 15. It will be observed that the glass lining has been chipped or broken away on the outside surface where nozzle 1 is produced around a curve to become flange 2; where the glass lining has been removed, corrosion has significantly altered the contours of the metal structure.

In this situation, a judgment must always be made whether the remaining metal, including the entire periphery of the nozzle and, with particular reference here, to the illustrated damage, whether flange 2, has sufficient strength, rigidity, and other properties to warrant repair. The prompt detection of a break and prompt repair usually make it possible to repair rather than replace the nozzle.

FIG. 2 illustrates that the shield of the present invention conforms, to a very close approximation, to, and fits snugly over and within nozzle 1. More particularly, the shield 20, formed of corrosion-resistant metal usually tantalum, can be made in three pieces. A first piece 22 is produced in the general form of a piece of tubing flared at one end and crimped at the other end. Crimp 23 is so designed as to bring edge 25 into at least slightly spring-biased contact with most points it faces on the inner wall 5 of the nozzle, and more particularly the tubing portion of the nozzle.

At near its outer end, tubing piece 22 of shield 20 is flared approximately to conform to the original surface of nozzle 1, as that surface effects a transition from the cylindrical interior 5 of nozzle tube to the outer face 12 of flange 2 of nozzle 1. The curvature 24 of shield 20 should closely approach the dimensions and conformation of the corresponding curvature of nozzle 1.

A disc piece 27 is produced with a large, circular central opening to span, or approximately span the distance of the outer face 12 of flange 2. A collar piece 30 is produced in the form of a very short length of tubing being produced at one end in curvature 25 again closely to conform to the curvature of the outer edge of face 12 of flange 2. Collar piece 30 is produced in depth sufficient substantially entirely to cover the outer wall 13 of flange 2. Joints 32 and 33, where tubing piece 22 and collar piece 30 meet disc piece 27 to define the entire shield 20 of the present invention, are made secure and, particularly, liquid tight. In the instance when present shield 20 is formed of tantalum, often the metal of choice because of its low chemical reactivity, securing of tubing piece 22 and collar piece 30 to disc piece 27 will be effected by welding, employing the known specialized methods by which to make secure metal-to-metal bonds in tantalum. When other metals are used, as in some exposures they may be, other methods of securing the metal pieces together may be employed. Further, when employed metal is lead or some other readily workable material, shield 20 can be formed of a single piece as by spinning and the like.

When installing shield 20 of the present invention, damage 15 is carefully assessed. If chipped or cracked portions of glass lining 10 proceed outwardly from the severest portion of damage 15, then such glass is removed, usually by grinding with precision equipment, to remove glass to the full extent of damage. If the metal surface of nozzle 1, laid bare at damage 15 is not clean and bright and free from corrosion and especially free from materials causing further corrosion, then the metal surface is also ground or otherwise treated to remove sources of possible subsequent damage. It is important that the site of the damage be brought to a clean, uniform, uncorroded condition before proceeding with the repair.

In completing the repair, any departure from original nozzle conformation at damage 15 is filled or approximately filled with resinous filler 35. A filler of choice should be a permanently curable material which, upon being applied as a plastic or liquid substance, is cured to obtain a material which does not soften with the application of heat, is securely adhesive to the surface of damage 15 including metal and glass surfaces, and is of appreciable mechanical strength. Usually, an epoxy resin will be the filler resin of choice. Preferably, an epoxy resin is employed which is plastic but not readily flowable at ambient temperatures; it is compounded with curing agents and the like and fitted into place, care being taken to secure good adhesion to the underlying surfaces. Surfaces can be solvent washed, if necessary, just prior to application of the resin. Thereafter, its plastic shape is given a form conforming approximately to the shape of the undamaged nozzle being repaired. The material is then cured; in one preferred procedure, an incandescent heat lamp is caused to play upon the curable resin till it is partially cured after which flow and further deformation are unlikely; and thereafter heat is increased as by moving the heat lamp closer or applying further heat lamps to elevate the temperature of the resin to a curing temperature.

After filler resin 35 has been cured or approximately so, it is formed as by filing, grinding, and the like to conform closely to the original shape of the nozzle under repair.

In an alternative procedure, damage 15 is filled with a curable plastic deformable resin 35 which is then given, to a close approximation, the shape of the nozzle being repaired and permitted to remain in an uncured condition until shield 20 is in place.

In a preferred technique of installing shield 20, cementitious resin 37 is applied to nozzle 1 over all surfaces which are to be covered by shield 20, including outer wall 13 of flange 2, face 12 of flange 2 and inner wall 5 of nozzle tube, the cementitious resin being applied, usually as a material of viscosity lower than that of the resinous filler, over the surface of the uncured and only approximately conforming resinous filler.

Also, the corresponding interior surfaces of shield 20, those surfaces which are to cover and cooperate with the indicated surfaces of nozzle 1, are similarly coated with cementitious resin 37. Any securely adhesive, chemically resistant, thermoset resin of good physical strength can be employed; in practice, a resin of the furan type has been employed with good results. In the working art of repair of glass-lined vessels, this process of applying a coat of cementitious material is usually spoken of as "buttering" and the resulting surface is described as "buttered." With both male and female surfaces thus buttered, shield 20 is slipped into place. It will be apparent that shield 20 is slipped into place by introducing the end of tubing piece 22 bearing edge 25 of crimp 23 into the tube of nozzle 1 by its inner wall 5. Shield 20 is introduced farther and farther into the nozzle tube until disc piece 27 seats against face 12 of flange 2, at which time collar piece 30 also extends over outer wall of 13 of flange 2. Care should be taken to exclude, as far as possible, air bubbles from being entrapped within the cementitious resin 37 between shield 20 and nozzle 1. A rubber mallet can be judiciously used, to make the seating of the shield over the nozzle secure and carefully conforming.

Depending upon the problem of the particular nozzle under repair, and depending most heavily upon the extent and conformation of damage 15, it may be desired, at this time, by the application of a square (actually, a right-angle measuring tool of metal) to establish that the newly disposed outer face of disc piece 27 is at right angles, or nearly enough for satisfactory performance at right angles to long axis 3 of nozzle 1, in order that, when the assembly is complete, the newly formed face, notably the face of disc piece 27 will be appropriately disposed for connection with nozzles terminating glass-lined pipe by which the reactor vessel or the like is to be connected for service. Advantageously, and in the best practice of the invention, when shield 20 is in final position and ready to complete the repair, it is securely and accurately clamped into its final position and held. In this situation, then, cementitious resin 37 is cured and if resinous filler 35 has not previously been cured it is cured at this time also. The delay of curing resinous filler 35 until after the installation into place of shield 20 has the advantage that the inner conformation of shield 20 defines the surface conformation needed in repair of break 15. Such procedure obviates sometimes tedious filing or grinding of cured resinous filler 35 prior to installation of shield 20.

In practicing the best mode of the present invention, upon the completion of the forming and assembly of shield 20, and in particular upon the completion of the welding of joints 32 and 33 whereby the assembly of the entire shield is completed, the annular well or recess defined when disc piece 27 is downward, so that tubing piece 22 and collar piece 30 rise as walls, should be fluidtight. This can be tested by holding shield 20 in the indicated position, and pouring the said annular recess full or substantially full of acetone. Acetone more quickly seeks out a fluid leak than does water. It is much preferred that the metal of shield 20, including all its joints, be intact and fluid tight than that reliance be placed upon the fluid tight characteristic of cementitious resin 37 after its cure. Cementitious resin 37 should be regarded as an adhesive and should not be relied upon for exclusion of corrosive fluids.

It is essential and critical, in the best practice of the present invention, to produce shield 20 with collar piece 30 occupying substantially exactly the form and position indicated. On experience it has been found that, absent collar piece 30, but all other structures being appropriately formed and intact of suitable materials, corrosion frequently works in at the outer edge of exposed face 12 of flange 2, working its way under glass lining 10, and necessitating re-repair of a once repaired nozzle fairly soon. Also, in the best mode of practicing the present invention it is essential and critical that tubing piece 22 terminate inwardly in crimp 23 biasing edge 25 against inner wall 5 of the tubular portion of nozzle 1.

Depending upon the chemical environment and other factors, resinous filler 35 and cementitious resin 37 can be further portions of the same substance.

I claim:
1. Method of repairing a damaged vitreous coated reaction equipment nozzle which comprises the steps of
  1. cleaning the site of damage to remove weakened material and leave the site substantially clean;
  2. depositing a modable, adhesive, irreversibly curable, thermosetting resin at the site of the damage to bring the contour of the damage locus to substantially its original contour;
  3. applying cementitious resin over the exterior sidewall, outward face, and inward surfaces of the nozzle to the extent to be covered by a patch member
  4. applying a similar cementitious resin to the cooperating surfaces of a formed sheet metal patch, said cementitious resin being characterized by being substantially fluid member; curing, heat-curable, thermosetting, and highly adhesive;
  5. applying said patching sheath, which consists essentially of a shallow cylindrical outer wall covering, conforming to and protecting the outer wall of the nozzle flange; a circular wall defining a central aperture, said circular wall covering and conforming approximately to the outer flange face of said nozzle; and a cylindrical portion conforming substantially to the interior aspect of the tubular portion of said nozzle and being produced at a first end to a crimp that spring biases contact between the metal of said tubular portion and the wall with which it mates and being produced at its other end into a flange of which the curvature conforms closely to the curvature of the corresponding part of the nozzle under repair, said collar and said tubular portion being united with said disc portion in a fluid tight manner; so disposing the said sheath as to cover and secure by cementitious resin the cylindrical outer wall covering over the outer wall of the flange; the circular wall defining a central aperture over the outer flange face of the said nozzle, and the cylindrical portion covering and reaching into the interior aspect of the tubular portion of said nozzle;
  6. and thereafter heat-curing the moldable filler resin and the cementitious resin whereby said sheath is secured into patching position.

* * * * *